US012746743B2

(12) United States Patent
Schulz et al.

(10) Patent No.: US 12,746,743 B2
(45) Date of Patent: Sep. 29, 2026

(54) MULTILAYER BIODEGRADABLE TUBE LAMINATE WITH PAPER LAYER AND PROTECTIVE COATING ARRANGED THEREON, TUBE BODY, AND TUBE

(71) Applicant: Huhtamaki Flexible Packaging Germany Gmbh & Co. KG, Ronsberg (DE)

(72) Inventors: Detlev Schulz, Dietmannsried (DE); Michael Dorn, Dietmannsried (DE); Franz Denk, Markt Rettenbach (DE)

(73) Assignee: Huhtamaki Flexible Packaging Germany Gmbh & Co. KG, Ronsberg (DE)

( * ) Notice: Subject to any disclaimer, the term of this patent is extended or adjusted under 35 U.S.C. 154(b) by 376 days.

(21) Appl. No.: 18/425,702

(22) Filed: Jan. 29, 2024

(65) Prior Publication Data

US 2024/0262092 A1 Aug. 8, 2024

(30) Foreign Application Priority Data

Feb. 7, 2023 (DE) ..................... 10 2023 102 876.6

(51) Int. Cl.
*B32B 27/10* (2006.01)
*B32B 1/08* (2006.01)
(Continued)

(52) U.S. Cl.
CPC ................ *B32B 27/10* (2013.01); *B32B 1/08* (2013.01); *B32B 27/302* (2013.01); *B65D 35/08* (2013.01);
(Continued)

(58) Field of Classification Search
CPC ......... B32B 27/10; B32B 1/08; B32B 27/302; B32B 2255/12; B32B 2255/26; B32B 2255/28; B32B 2307/308; B32B 2307/4023; B32B 2307/7163; B32B 2307/718; B32B 2307/7244; B32B 2307/7246; B32B 2307/7376;
(Continued)

(56) References Cited

U.S. PATENT DOCUMENTS 5,213,858 A 5/1993 Tanner et al.
8,771,813 B2 7/2014 West et al.
(Continued)

FOREIGN PATENT DOCUMENTS

DE 102021125162 A1 3/2023
EP 2530029 A1 12/2012

OTHER PUBLICATIONS

English machine translation for JP2006-056527. (Year: 2006).*
(Continued)

*Primary Examiner* — Michael C Miggins
(74) *Attorney, Agent, or Firm* — Rankin, Hill & Clark LLP

(57) ABSTRACT

A multilayer tube laminate for producing a tube container, having:
- at least one paper layer,
- a polymer layer with a sealable exposed polymer surface on one side of the at least one paper layer, and
- a polymer coating from an olefin-based material applied directly on the at least one paper layer on another side of the at least one paper layer facing away from the sealable polymer layer;

the polymer layer being formed to more than 90% by weight from a biodegradable polymer.

17 Claims, 4 Drawing Sheets

(51) Int. Cl.
*B32B 27/30* (2006.01)
*B65D 35/08* (2006.01)
*B65D 65/40* (2006.01)

(52) U.S. Cl.
CPC .......... *B65D 65/40* (2013.01); *B32B 2255/12* (2013.01); *B32B 2255/26* (2013.01); *B32B 2255/28* (2013.01); *B32B 2307/308* (2013.01); *B32B 2307/4023* (2013.01); *B32B 2307/7163* (2013.01); *B32B 2307/718* (2013.01); *B32B 2307/7244* (2013.01); *B32B 2307/7246* (2013.01); *B32B 2307/7376* (2023.05); *B32B 2439/40* (2013.01); *B65D 2565/387* (2013.01)

(58) Field of Classification Search
CPC ........... B32B 2439/40; B32B 2255/20; B32B 2255/205; B32B 2307/31; B32B 2597/00; B32B 27/306; B32B 27/26; B65D 35/08; B65D 65/40; B65D 2565/387
See application file for complete search history.

(56) References Cited

U.S. PATENT DOCUMENTS

2014/0099502 A1 4/2014 Nevalainen et al.
2016/0272389 A1 9/2016 Wang et al.
2017/0008227 A1 1/2017 Räsänen et al.
2019/0279832 A1 * 9/2019 Tsukamoto ............ H01H 47/02
2022/0332098 A1 10/2022 Mutha et al.
2022/0402659 A1 12/2022 Hsu

OTHER PUBLICATIONS

European Extended Search Report for corresponding EP 24155598.6 mailed Jun. 14, 2024, 7 pgs.
German Search Report for corresponding DE 10 2023 102 876.6 mailed Jan. 22, 2024, 7 pgs.
Espacenet Bibliographic data: DE 102021125162 (A1), Published Mar. 30, 2023, 2 pgs.
Espacenet Bibliographic data: EP 2530029 (A1), Published Dec. 5, 2012, 1 pg.

* cited by examiner

MULTILAYER BIODEGRADABLE TUBE LAMINATE WITH PAPER LAYER AND PROTECTIVE COATING ARRANGED THEREON, TUBE BODY, AND TUBE

This application claims priority in German Patent Application DE 10 2023 102 876.6 filed on Feb. 7, 2023, which is incorporated by reference herein.

The present invention concerns a multilayer tube laminate for producing a tube container, comprising At least one paper layer, A polymer layer with a sealable exposed polymer surface on one side of the at least one paper layer, and A polymer coating from an olefin-based material applied directly on the at least one paper layer on another side of the at least one paper layer facing away from the sealable polymer layer.

BACKGROUND OF THE INVENTION

Such a tube laminate is known from WO 2015/061980 A1. The polymer coating of the paper layer known from this publication exhibits a thickness of 5 to 25 μm and serves for bonding an outer sealing layer which is necessarily present at the state of the art tube laminate with the single paper layer. Between the outer sealing layer and the polymer coating there can additionally be applied a further adhesive layer made from essentially the same material as the polymer coating.

WO 2015/061980 A1 deals with preventing or reducing plastic waste which results from the use of tubes as containers for pastes and gels after expiration of their useful life. To this end, WO 2015/061980 A1 suggests reducing the plastic i.e. polymer fraction in the tube laminate, and proposes arranging a paper layer instead of a polymer layer in the tube laminate.

From WO 2021/053043 A1 there is known a tube laminate with at least two paper layers, which exhibits either an exposed paper layer directly on an outer side or a sealable polyolefin layer. A tube laminate with an exposed paper layer is practically unusable, since normally a tube is a reclosable container which is opened and closed repeatedly, such that a paper layer exposed towards the outside would be contaminated by humidity and/or grease and/or dirt. A paper layer exposed towards the inside would very rapidly be soaked with ingredients of the flowable tube content.

The layer sequence proposed in WO 2021/053043 A1 with an exposed EVOH barrier layer is just as poorly usable as a tube laminate. EVOH is normally hydrophilic and should therefore be shielded against humidity and water.

Therefore the tube laminates disclosed in WO 2021/053043 A1 with exposed paper layer and with exposed EVOH barrier layer, presumably involve laminate precursors which are still to be completed into a deployable tube laminate through the arrangement of further layers.

In the case of WO 2015/061980 A1, the sealable polymer layer exhibits a thickness of at least 30 μm, where the thickness actually used lies rather in a disclosed preferred range from 39 to 45 μm.

The ready-for-use tube laminates known from WO 2021/053043 A1 likewise exhibit a sealable polymer layer made from LDPE with a thickness of 30 μm situated on their outside.

In sorting plants, such sealing layers on the outside of the tube laminate prevent automated detection of the paper layer. Such automated detection of the paper layer takes place in a manner which is known per se by using near-infrared technology.

The term ‘the outside of the tube laminate’ denotes in the present case that side of the tube laminate which forms the outside of the tube and/or tube container respectively formed from it.

When the paper content of a tube laminate is sufficiently high, the tube laminate can be recycled advantageously in a paper recycling stream. To this end, however, the automated detectability of the laminate as a sufficiently paper-containing tube laminate is important. Normally, this detectability is not present optically in the visible spectral range due to applied printing and/or dyeing of outer polymer layers, since the applied printing and/or the dyeing shields from view a paper layer situated nearest to the outside of the tube laminate.

In many countries and in many instances, as the case may be, faulty detection of a disposed-of tube container does not lead to a desired recovery of the disposed-of tube but rather to its thermal recycling with the formation of carbon dioxide or to its depositing in a landfill, where the disposed-of tube remains for decades.

SUMMARY OF THE INVENTION

It is the task of the present invention to improve the environmental compatibility of tube laminates.

The present invention solves this task in a tube laminate mentioned in the beginning, by the polymer layer being formed to more than 90% by weight from a biodegradable polymer. The biodegradable polymer is here a biodegradable synthetic pursuant to European Standard EN 13432. In this context, a biodegradable polymer is normally a polymer which under certain conditions can be decomposed in less than one year by means of enzymes through microorganisms such as fungi or bacteria. The breakdown takes place essentially through oxidation and hydrolysis processes into the byproducts water, carbon dioxide or methane, and biomass. By forming the polymer layer to more than 90% by weight from a biodegradable polymer, the laminate and any packaging body that may be produced from it, such as for instance a tube body, can be decomposed even if undesirably it has been carelessly thrown away.

Admittedly, the biodegradation process can take significantly longer in comparison with the composting of biological material. Nevertheless, the slow biological breakdown is still significantly more advantageous than the durability of conventional, non-biodegradable polymers, such as for instance polyethylene, polypropylene, or the polyester often used for packaging materials such as polyethylene terephthalate.

The biodegradable polymers discussed in the present application are expressly not the polymers declared in the professional world as ‘oxo-biodegradable’ or ‘oxo-degradable’.

The most complete biological degradability possible of the tube laminate and any container body produced from it can be achieved by the polymer layer consisting of a biodegradable polymer. Unavoidable contaminations of the biodegradable polymer should be disregarded here.

The biodegradable polymer can comprise or be at least one polymer out of polylactic acid (PLA), polybutylene succinate (PBS), polybutylene succinate adipate (PBS), a polyhydroxyalkanoate, in particular polyhydroxy butyrate (PHB) and/or polyhydroxy butyrate hexanoate (PHBH), polyvinyl alcohol (PVOH), polybutylene adipate terephthalate (PBAT), polycaprolactone (PCL), polyglycolide, a lignin-based thermoplastic, and an epoxy acrylate based on at least one oil. The oil as basis of the epoxy acrylate is preferably a plant oil, in particular linseed oil or palm oil.

The biodegradable polymer is preferably a thermoplastic polymer, such that it can be simply brought into a desired shape through primary forming, in particular through extrusion. Furthermore, thermoplastic polymers offer the fundamental possibility of forming sealable surfaces.

The choice of material of biodegradable polymers mentioned directly above applies to all biodegradable polymers mentioned in the present application, not only but rather especially to the biodegradable polymer of the polymer layer with the sealable surface.

In principle, the polymer layer can be a multilayer polymer layer where preferably each layer of the polymer layer is formed from a biodegradable polymer. Here, different layers of the polymer layer can be formed from different biodegradable polymers. The polymer layer can also exhibit two or more layers formed from the same degradable polymer or at least based on the same degradable polymer.

According to a preferred development of the present invention, the polymer coating mentioned at the beginning is preferably a protective polymer coating with a weight per area in the range from 0.5 g/m$^2$ to 4.9 g/m$^2$. This protective polymer coating can either be exposed towards the outside or carry applied printing in order to provide consumer information.

Through the application of the polymer coating as a protective polymer coating, the unimpaired use of a tube formed from the tube laminate as reclosable packaging can be ensured, since during storage or use of the tube, humidity, dirt, or grease reaching its outer surface are kept away by the protective polymer coating from the paper layer carrying it.

At the same time, the protective polymer coating with a weight per area of less than 5 g/m$^2$ is so thin that the currently known methods for detecting the paper layer lying under the protective polymer coating can be applied without impairment. This is also the case even if the protective polymer coating does not form an exposed surface of the tube laminate and thus of the tube formed from it, but instead carries additional applied printing, for instance in order to apply consumer information to the outside of the tube laminate or of the tube formed from it as the case may be, in a manner discernible for a consumer. Applied printing can likewise be configured as very thin, for instance with thicknesses in the single-digit micrometer range, such that even applied printing placed on the protective polymer coating does not impair the automated detection of the tube laminate as paper-containing.

Thus, preferably the protective polymer coating or the protective polymer coating and the applied printing, where appropriate with the interposition of a primer layer between the protective polymer coating and the applied printing in order to increase the adhesion of the applied printing onto the protective polymer coating, is or are the sole layers of the tube laminate arranged on the one side of the paper layer. Where required, a primer layer can also be arranged between the paper layer and the protective polymer coating in order to increase the adhesion of the protective polymer coating to the paper layer. Preferably, however, the protective polymer coating is applied directly onto the paper layer and is in contact with it.

The thin configuration of the protective polymer coating and the preferred holding back from having considerably thicker polymer sealing layers adjoining it in the direction away from the at least one paper layer, not only make possible the automated detection of the paper layer in the tube laminate as described above and accordingly automated assignment of the tube laminate to a paper-assigned recycling stream, but also help to achieve the highest possible weight fraction of paper in the tube laminate.

Direct application of the protective polymer coating without interposition of a primer layer is possible in an especially simple manner in an advantageous further development of the present invention when the protective polymer coating comprises at least one acid-modified olefin, in particular polyolefin, or consists of such. The protective polymer coating can preferably comprise at least one copolymer out of ethylene methacrylic acid copolymer and ethylene methacrylate copolymer or consist of such. Especially preferably, the protective polymer coating comprises an ethylene methacrylic acid copolymer or consists of such. The aforementioned copolymers offer on the one hand good protection from any influence on the tube laminate, in particular on the at least one paper layer of the same, proceeding from the external environment of the tube laminate. On the other, the aforementioned copolymers, first and foremost the especially preferred ethylene methacrylic acid copolymer, offer a high adhesion effect with the paper of the paper layer and also with other polymers, such that the aforementioned copolymers despite their thin coating configuration with a weight per area of 4.9 g/m$^2$ or less can be a foundation for sealing with the sealable polymer layer on the one side of the at least one paper layer or with a separate sealing strip, as it is described further below.

In a preferred development of the present invention, the protective polymer coating exhibits a weight per area in the range from 1 g/m$^2$ to 2.5 g/m$^2$. This suffices for protecting the paper layer from external influences and further improves the detection quality of automated detection of the paper layer, especially if onto the protective polymer coating there is further placed applied printing, as is usual for tube laminates on their outside.

Preferably, therefore, the aforementioned sealable surface forms an inner side of the tube laminate and the aforementioned other side of the tube laminate with the protective polymer coating and/or with the applied printing as the case may be forms an outer side of the tube laminate.

For adequately informing consumers about the content, quantity, origin, and the like of a substance packaged in the relevant tube container produced from the tube laminate, the protective polymer coating, as set out above, preferably carries the applied printing. Further preferably, the applied printing is placed directly onto the protective polymer coating, in contact with it. Where required, however, a thin primer layer with a thickness in the single-digit micrometer range, for instance with a thickness of between 0.5 to 6 μm, can be placed between the applied printing and the protective polymer coating in order to increase the adhesion of the applied printing to the protective polymer coating.

The applied printing is further preferably formed from a layer of overprint varnish and a layer region of printing inks arranged between the overprint varnish layer and the protective polymer coating. The overprint varnish serves to protect the printing inks against influences from the external environment.

The overprint varnish preferably lies free with its surface which faces away from the at least one paper layer, thus preferably forming an outer surface of the tube laminate and of the tube formed from it.

As an especially resistant overprint varnish there has proved itself an acryl-based varnish, which therefore is preferably chosen as overprint varnish.

Such applied printing, that is, printing inks plus overprint varnish, preferably exhibits a thickness of less than 3 μm. Thus it is ensured that the applied printing together with the protective polymer coating and where applicable an interposed primer layer does not disturb the automated detection of the paper layer as such and/or the detection of the tube laminate as paper-containing, as the case may be, through near infrared technology.

Preferably, starting from the surface of the at least one paper layer situated nearest to the other side, no more than 12 μm, especially preferably no more than 9 μm, and even more preferably no more than 6 μm of further coating material are configured in total over the paper layer up to an exposed surface of the tube laminate. The further coating material preferably comprises only the protective polymer coating and the applied printing, where applicable with the interposition of a primer layer. Without the applied printing, preferably no more than the aforementioned maximum 4.9 $g/m^2$ of protective polymer coating are applied on the surface of the paper layer situated nearest to the other side. The protective polymer coating then forms a free surface of the tube laminate.

To prevent migration of oxygen and/or of water vapor through the tube laminate, the tube laminate can preferably exhibit at least one barrier layer. The at least one barrier layer preferably comprises a vinyl alcohol polymer and/or metallization and/or a metal oxide or is formed from such a material.

The tube laminate preferably exhibits over its entire thickness an oxygen permeability of no more than 2.0, preferably of no more than 1.5 $cm^3/(m^2 \cdot d \cdot bar)$, measured in accordance with DIN 53380-3 at 23° C. and 50% relative humidity, and a water vapor permeability of no more than 2.0, preferably of no more than 1.5 $g/(m^2 \cdot d)$, measured in accordance with ISO 15106-2 at 23° C. and 90% relative humidity.

Polyvinyl alcohol (PVOH) or butenediol vinyl alcohol copolymer (BVOH) can be used as a vinyl alcohol polymer with the desired barrier effect and at the same time advantageous biological degradability. Such a vinyl alcohol polymer barrier layer can, for example, be arranged between the at least one paper layer and a biodegradable polymer layer on the one side of the at least one paper layer. Thus according to an embodiment of the present invention, the vinyl alcohol polymer barrier layer can be arranged between the at least one paper layer and the biodegradable polymer layer with the sealable surface.

Furthermore, between the vinyl alcohol polymer barrier layer and the at least one paper layer there can be arranged a further polymer layer, for instance from a polymer which increases the adhesion of the barrier layer to the paper layer. Preferably the polymer of the further polymer layer is also biodegradable.

On the one side of the paper layer, that is, on the side of the paper layer facing away from the protective polymer coating, in the layer sequence of the tube laminate there can if required be arranged one or several adhesive layers.

A metallization is preferably configured as a metallization coating deposited from a vapor phase. It can be deposited directly onto the at least one paper layer. If the at least one paper layer comprises more than one paper layer, the metallization coating is preferably deposited onto a further paper layer which is arranged at a distance from the paper layer situated nearest to the protective polymer coating. In principle, it makes no difference to the barrier effect of the metallization whether the metallization is arranged on the side nearer to the biodegradable polymer layer with the sealable surface or on the side nearer to the protective polymer coating of the further paper layer. Since, however, normally the metallization should prevent migration of oxygen and water vapor from the external environment into the packaging space of a tube container, preferably the metallization is arranged on the side of the further paper layer facing towards the protective polymer coating.

Any metal can be used as metal precipitated from the vapor phase, for instance through vacuum vapor deposition. Preferably, aluminum or an aluminum alloy is used to form the metallization.

For a metal oxide barrier layer, often also referred to as a 'ceramic' barrier layer, the aforementioned statements regarding metallization apply mutatis mutandis. The metal oxide barrier layer too, is preferably deposited from a vapor phase, for example through vacuum vapor deposition, on a substrate, preferably on a further paper layer. Possibilities for a metal oxide for forming the barrier layer include at least a metal oxide consisting of aluminum oxide and silicone oxide.

A metal or metal oxide barrier layer deposited from the vapor phase can also, the above description with a paper layer as substrate layer notwithstanding, within the scope of the present invention be deposited on a polymer film which can be bonded with another layer of the tube laminate, in particular with the at least one paper layer, through adhesion lamination by means of a solvent-based adhesive or through extrusion lamination by means of a thermally softened thermoplastic synthetic. The polymer of the polymer film is preferably biodegradable. Likewise, the thermoplastic synthetic of the extrusion lamination layer is also preferably biodegradable in order to achieve the highest possible weight fraction per area of biodegradable synthetic out of the total weight per area of the tube laminate.

The present tube laminate preferably exhibits a weight per area in the range from 150 $g/m^2$ to 400 $g/m^2$, in order to be able to provide sufficient stability of a tube container without unnecessary packaging weight. The weight per area of the tube laminate preferably lies in the range from 200 $g/m^2$ to 250 $g/m^2$.

The present tube laminate preferably exhibits a thickness in the range from 200 μm to 400 μm. The thickness of the tube laminate preferably lies in the range from 275 μm to 350 μm.

The weight per area of the at least one paper layer in the tube laminate preferably lies in the range from 80 $g/m^2$ to 350 $g/m^2$.

For recovery of the tube laminate in a paper-assigned recycling stream, it is preferable if the weight fraction of the at least one paper layer out of the total weight per area of the tube laminate is at least 75%. Especially preferably, the weight fraction of the at least one paper layer out of the total weight per area of the tube laminate is at least 80%, even more preferably at least 85%.

The tube laminate can exhibit exactly one paper layer. Its weight per area then lies preferably in the range from 80 to 220 $g/m^2$, preferably from 100 to 200 $g/m^2$. The tube laminate can also exhibit more than one paper layer. Preferably one of the paper layers then carries the aforementioned barrier layer. When arranging exactly two paper layers in the tube laminate, the weight per area of each of the two paper layers preferably lies in a range from 40 $g/m^2$ to 175 $g/m^2$, especially preferably in a range from 40 $g/m^2$ to 150 $g/m^2$.

The present invention further concerns a tube body formed from a tube laminate, as above described and further developed.

The tube body comprises a tube laminate blank, which in a manner that is known per se is rolled about a tube body longitudinal axis, where the end regions of the tube laminate blank which face towards one another in the circumferential direction about the tube body longitudinal axis are bonded with one another through sealing, forming a sealed seam running in the direction along the tube body longitudinal axis. The tube body can exhibit at least section-wise along the tube body longitudinal axis a lumen cross-section which is constant in shape and/or size in a sectional plane considered orthogonally to the tube body longitudinal axis and/or the tube body can exhibit at least section-wise a lumen cross-section which increases along the tube body longitudinal axis. The lumen cross-section is the area bordered by the tube body in the relevant sectional plane orthogonal to the tube body longitudinal axis.

Due to the tube body encircling the longitudinal direction of the tube body, the tube body longitudinal axis defines an axial direction proceeding in parallel to it, a circumferential direction encircling it, and radial directions proceeding orthogonally away from it.

The sealed seam can either i) Be an overlap sealed seam, in which the biodegradable polymer layer with the sealable surface overlaps the protective polymer coating in an overlap region, where the overlap region extends in the circumferential direction and in the direction along the tube body longitudinal axis and where the biodegradable polymer layer with the sealable surface and the protective polymer coating are firmly bonded with one another in the overlap region, or can ii) be a butt sealed seam, in which the end regions which face towards one another in forming a butt joint which proceeds in the direction along the tube body longitudinal axis and radially away from the tube body longitudinal axis, approach one another butt-to-butt where the butt joint on at least one radial side with respect to the tube body longitudinal axis is covered by a sealing strip which extends along the butt joint, spans the butt joint in the circumferential direction, and on each of the two circumferential sides of the butt joint is firmly bonded with an exposed surface section.

The above option ii) for forming the sealed seam is preferred for durable and secure formation of an all-round closed tube body. Further preferably there is provided on each of the two radial sides of the butt joint a sealing strip which extends along the butt joint, covering it, and which in the circumferential direction on each of the two sides of the butt joint is firmly bonded with an exposed surface section of the tube body.

The at least one sealing strip is preferably a strip with a surface formed by a sealable polymer, in particular by a biodegradable sealable polymer, where the surface, with the arrangement of the sealing strip at the tube body, is in contact with the exposed surface of the tube body. Although in principle the firm bonding of the sealing strip with the tube body can be achieved by gluing, firm bonding through thermal sealing is preferable. On the outside of the tube body, in the event of a butt sealed seam being configured, the surface section of the tube body in contact with the sealing strip and/or the end regions of the rolled tube laminate blank which are to proceed onto one another in the circumferential direction, as the case may be, are preferably left free from applied printing in order to allow direct contacting of the protective polymer coating by the sealing strip, thus achieving higher bonding firmness of the sealing strip with the tube body.

The present invention concerns besides a tube with a tube body, which is configured as described above.

The tube body is bonded with a tube shoulder which exhibits at least one exposed surface made from a polymer encircling the tube body longitudinal axis, where an exposed surface of the tube body is firmly bonded through sealing with the encircling exposed surface of the tube shoulder through.

In order to improve the environmental compatibility not only of the tube laminate and of a tube body formed from it but rather of the entire tube, preferably the tube shoulder is formed predominantly, for preference completely, from a biodegradable polymer. Possibilities for a biodegradable polymer include at least one of the biopolymers mentioned above for the polymer layer with the sealable surface. Preferably at least one initially exposed surface section of the tube shoulder is formed from the same biodegradable polymer as an initially exposed surface section of the tube body which during the formation of the tube comes into abutment against the exposed surface section of the tube body for the purpose of thermal firmly-bonded fusing. The sealable surface of the tube body facing towards the packaging space of the tube preferably comes into abutment with an initially exposed surface section of the tube shoulder facing radially outward and is being or is, as the case may be, firmly bonded with it through thermal sealing.

The present application uses the terms ‘tube container’ and ‘tube’ as synonymous.

Preferably an embodiment of the tube laminate being presented here is formed only from the aforementioned layers.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein.

Figure 1:
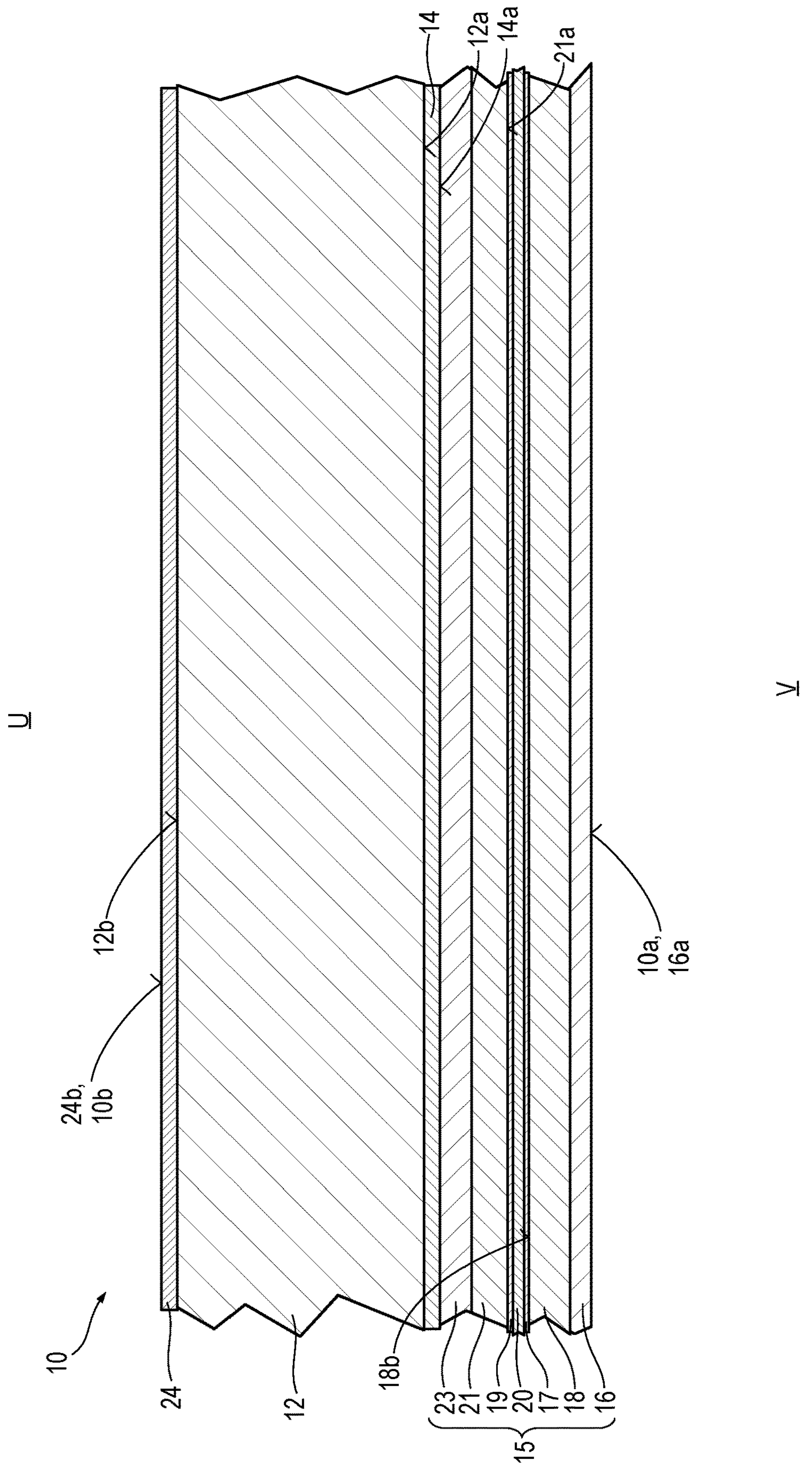
FIG. 1A schematic cross-sectional view of a first embodiment of a tube laminate according to the invention, FIG. 2A schematic cross-sectional view of a second embodiment of a tube laminate according to the invention, FIG. 3A schematic cross-sectional view of a first embodiment of a tube body when considering a sectional plane orthogonal to a tube body longitudinal axis, FIG. 4A schematic cross-sectional view of a second embodiment of a tube body when considering a sectional plane orthogonal to a tube body longitudinal axis, and FIG. 5A rough schematic elevation view of a tube formed from a tube laminate of FIG. 1 or 2.

The depictions in the drawings are not to scale.

DESCRIPTION OF PREFERRED EMBODIMENTS

Referring now to the drawings wherein the showings are for the purpose of illustrating preferred and alternative embodiments of the invention only and not for the purpose of limiting the same, in FIG. 1, a first embodiment of a tube laminate according to the invention is denoted generally by 10. The tube laminate 10 exhibits an inner side or inner surface 10*a* facing towards a packaging space V of a tube container formed from the tube laminate 10 and exhibits on the tube container formed from the tube laminate 10 an outer side or outer surface 10*b* exposed towards the external environment U (see also FIGS. 3 and 4).

The tube laminate 10 of the first embodiment exhibits a single paper layer 12 with a preferred weight per area of 100 to 200 $g/m^2$. On its one side 12*a* there is applied on the paper layer 12 by means of wet printing, layer 14 of a water-based wet laminating adhesive, for instance casein-based, for instance with a roller. The weight per area of the adhesive layer 14 is preferably between 2 and 10 $g/m^2$.

On the side 14*a* of the adhesive layer 14 which faces away from the paper layer 12 there is arranged a multilayer combined barrier and sealing film 15, which is bonded with the paper layer 12 by the adhesive layer 14.

The combined barrier and sealing 15 is formed through coextrusion of all the layers contained in it and exhibits a sealable layer 16 made from biodegradable PBS, a first intermediate layer 18 made from a biodegradable polymer, preferably from PBSA, a second intermediate layer 21 made from a biodegradable polymer, preferably from PBSA, and an outer layer 23 made from a biodegradable polymer, preferably from PBSA. Between the biodegradable sealable layer 16 and the biodegradable outer layer 23, in particular between the first and the second intermediate layer 18 and 21, there is arranged a barrier layer 20 made from butenediol vinyl alcohol copolymer (BVOH).

Solely for the sake of completeness let it be mentioned that the barrier layer 20 is bonded through an interposed adhesive coating 17 or 19 as the case may be likewise made from BVOH both with the surface 18*b* of the biodegradable first intermediate layer 18 facing towards it and with the surface 21*a* of the biodegradable second intermediate layer 21 facing towards it and.

The barrier layer 20 made from BVOH reduces the oxygen permeability of the barrier film 15 and the biodegradable polymer coatings 16, 18, 21, and 23—the biodegradable polymer coatings 18, 21, and 23 to a greater extent than 16—reduce the water vapor permeability of the barrier film 15.

The combined barrier and sealing film 15 exhibits a thickness in the range from 30 to 160 μm, preferably from 40 to 150 μm.

The biodegradable sealable layer 16 exhibits a sealable surface 16*a*, forming the surface 10*a* of the tube laminate 10 which is exposed towards the packaging space V.

On its other side 12*b* there is applied onto the paper layer 12 a protective polymer coating 24 which preferably is made from ethylene-methacrylic acid copolymer, namely with a preferred thickness of 1 to 2.5 $g/m^2$, especially preferably of approximately 2 $g/m^2$. The protective polymer coating 14 protects the paper layer 12 against influences from the external environment U and at the same time allows, due to its low thickness, radiation-based detection of the paper layer 12, which makes possible automated feeding of the tube laminate 10 to a paper-assigned recycling stream.

The protective polymer coating 24 is applied by printing, for example through a pressure roller. Consequently, the application is a wet process.

Figure 2:
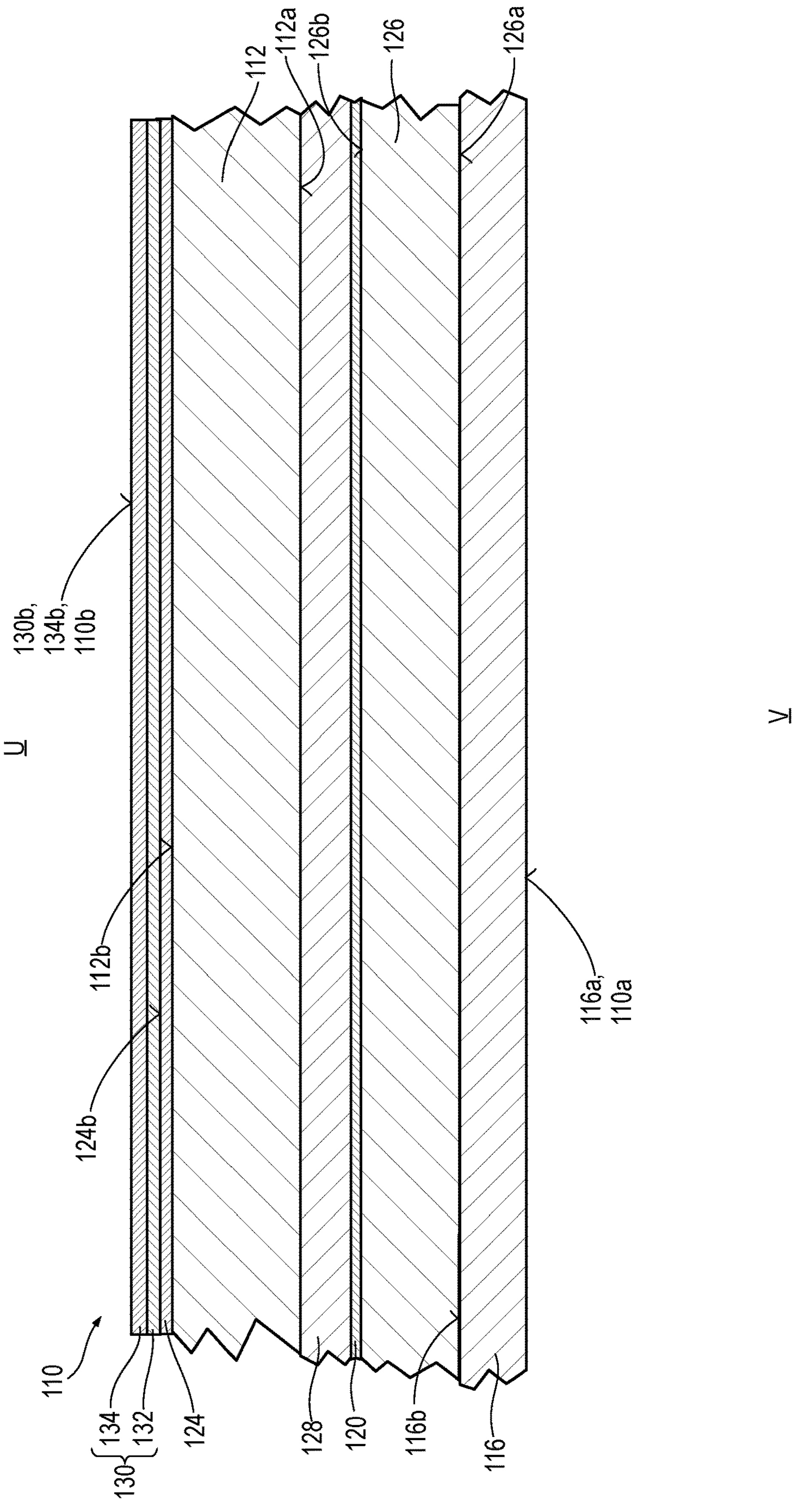

In FIG. 2 there is depicted in cross-section an alternative second embodiment of a tube laminate 110 according to the invention. Identical and functionally identical components and component sections as in FIG. 1 are labelled in FIG. 2 by the same reference symbols, but increased numerically by 100. The second embodiment depicted in FIG. 2 is described below only in so far as it differs from the first embodiment, to whose description express reference is otherwise made also for elucidating the second embodiment.

The tube laminate 110 of the second embodiment exhibits not only one paper layer 112, but instead exhibits additionally a second paper layer 126. The second paper layer 126 exhibits on its side 126*b* which faces towards the external environment U the barrier layer 120 as a layer made from polyvinyl alcohol (PVOH) or from butenediol vinyl alcohol copolymer (BVOH).

The paper layer 112 and the second paper layer 126 with the barrier layer 120 arranged on the latter are bonded through extrusion lamination by means of an extrusion laminating layer 128 made from PBSA and/or PBS. The extrusion laminating layer 128 for bonding the two paper layers 112 and 126 exhibits a weight per area of between 10 $g/m^2$ and 50 $g/m^2$, in particular of 10 $g/m^2$ and 30 $g/m^2$. Application weights of between 30 $g/m^2$ and 50 $g/m^2$ serve inter alia to improve the water impermeability of the tube laminate 110.

The paper layer 112 exhibits a weight per area of between 40 $g/m^2$ and 150 $g/m^2$. The second paper layer 126 likewise exhibits a weight per area of between 40 $g/m^2$ and 150 $g/m^2$, which however does not mean that the first and the second paper layer 112 and 126 always have to exhibit the same weight per area.

In the present second embodiment example, the biodegradable polymer layer 116 is not arranged as a blown film or a cast film as in the first embodiment example, but instead is extruded. The biodegradable polymer layer 116 exhibits a thickness of between 10 μm and 70 μm, in particular of 12.4 μm to 62 μm. The biodegradable polymer layer 116 can, as in the first embodiment example, be made from PBS or from a blend of PBS and PBSA.

The exposed surface 116*a* of the biodegradable sealable polymer layer 116 forms the inner surface 110*a* of the tube laminate 110 of the second embodiment.

On the surface 124*b* of the protective polymer coating 124 facing away from the paper layer 112 there is applied by printing an applied printing 130. This applied printing 130 exhibits a layer region with applied printing ink 132 and an acryl-based overprint varnish 134 which covers the applied printing ink 132 towards the external environment U. The applied printing ink 132 is therefore situated between the overprint varnish 134 and the protective polymer coating 124. An exposed surface 134*b* of the overprint varnish facing towards the external environment U forms the outer surface 110*b* of the tube laminate 110 of the second embodiment.

The applied printing 130, which of course can also be arranged at an appropriate place of the first embodiment, exhibits a thickness of less than 3 μm.

Despite the applied printing 130 on the protective polymer coating 124, the spacing between the outer surface 110*b* of the tube laminate and the surface 112*b* facing towards the external environment U of the paper layer 112 nearest to the external environment is so small, maximum 5 to 7 μm, that detection of the tube laminate 110 as paper-containing through near-infrared technology is possible without problems.

Figure 3:
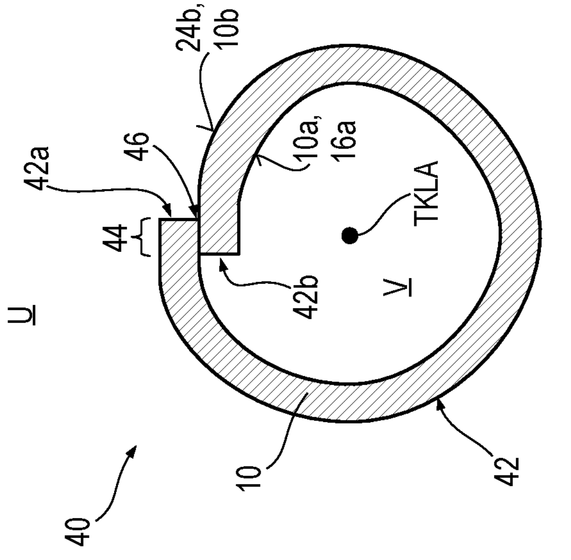

In FIG. 3 there is shown in rough schematic form a cross-section of a first embodiment of a tube body 40 formed from the tube laminate 10 of the first embodiment example of FIG. 1. The tube body 40 extends in the depiction as an idealized cylindrical tube body 40 along a tube body longitudinal axis TKLA which proceeds orthogonally to the drawing plane of FIG. 3.

A tube body blank 42 of the tube laminate 10 is rolled in the circumferential direction about the tube body longitudinal axis TKLA, where after the rolling end regions 42*a* and 42*b* of the tube body blank 42 which face towards one another in the circumferential direction overlap in an overlap region 44. In the overlap region 44, the sealable inner surface 10*a* of the tube laminate 10 overlies the outside 10*b* formed by the protective polymer coating 24. Due to the choice of materials, for example PBS or PBSA for the inner surface 10*a* of the tube laminate 10 and ethylene-methacrylic acid copolymer for the protective polymer coating 24, the inner surface 10*a* and the outer surface 10*b* are thermally sealable with one another, such that in the overlap region 44 an overlap sealed seam 46 can be formed through which the inner surface 10*a* and the outer surface 10*b* of the tube laminate 10 can be firmly bonded with one another.

The overlap sealed seam 46 extends over the entire overlap region 44, that is, essentially over the entire axial length of the tube body 40 with respect to the tube body longitudinal axis TKLA and in the circumferential direction along the actually existing overlap of the two end regions 42*a* and 42*b* of the tube body blank 42.

Figure 4:
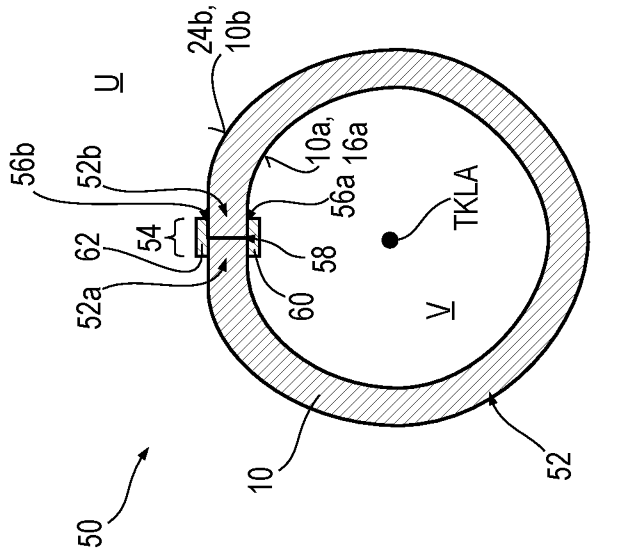

In FIG. 4 there is shown roughly schematically a cross-section of a second embodiment of a tube body 50, which again is formed from the tube laminate 10 of the first embodiment examples of FIG. 1. The tube body 50 of the second embodiment also extends in the depiction as an idealized cylindrical tube body 50 along a tube body longitudinal axis TKLA, which proceeds orthogonally to the drawing plane of FIG. 4. The tube body 50 of FIG. 4 is preferable to the tube body 40 of FIG. 3 due to the expected higher bonding safety.

A tube body blank 52 of the tube laminate 10 is again rolled in the circumferential direction about the tube body longitudinal axis TKLA, where after the rolling end regions 52*a* and 52*b* of the tube body blank 52 which face towards one another in the circumferential direction face each other butt-to-butt, forming a butt joint 58 extending along the tube body longitudinal axis TKLA, preferably even in parallel to it. Consequently, no overlap of the end regions 52*a* and 52*b* takes place.

The butt joint 58 is covered at each of its two radial sides with a sealing strip 60 and 62 respectively in such a way that each sealing strip extends along the butt joint 58 over essentially its entire axial length with respect to the tube body longitudinal axis TKLA and spanning the butt joint 58 in the circumferential direction on the exposed surfaces of the end regions 52*a* and 52*b*. Consequently, the sealing strips 60 and 62 overlap the end regions 52*a* and 52*b* in an overlap region 54.

The radially inner sealing strip 60, whose longitudinal direction likewise proceeds orthogonally to the drawing plane of FIG. 4, contacts the inner surface 10*a* of the tube laminate 10 in the two circumferential end regions 52*a* and 52*b*. The radially outer sealing strip 62, whose longitudinal direction likewise proceeds orthogonally to the drawing plane of FIG. 4, contacts the outer surface 10*b* of the tube laminate 10 in the two circumferential end regions 52*a* and 52*b*.

The sealing strips 60 and 62 are preferably constructed identically. They exhibit on their side which contacts the tube body 50 a sealable layer from a biodegradable polymer, preferably from PBS. The sealable PBS layer can be stabilized through a substrate layer.

The substrate layer is preferably likewise made from a biodegradable polymer, for instance from PBSA, to name just one example.

The sealing strips 60 and 62 are each firmly bonded through thermal sealing with the surface contacted by them of the tube laminate 10 or of the tube body 50 as the case may be. The sealing strip 60 forms with the inner surface 10*a* of the tube laminate 10 at the end regions 52*a* and 52*b* a part-butt sealed seam 56*a* spanning the butt joint 58, whereas the sealing strip 62 forms with the outer surface 10*b* of the tube laminate 10 at the end regions 52*a* and 52*b* a part-butt sealed seam 56*b* spanning the butt joint 58. The part-butt sealed seams 56*a* and 56*b* form together a butt sealed seam.

If the outside 10*b* of the tube laminate 10 is formed through applied printing, the latter is omitted in the overlap region 44 on the radially inner overlapping end section 42*b* and/or in the overlap section 54 respectively, so that sealable polymer surfaces can touch each other directly there.

The tube bodies 40 and 50 of FIGS. 3 and/or 4 respectively can be formed, instead of with the tube laminate 10 of the first embodiment example, with the tube laminate 110 of the second embodiment example.

Figure 5:
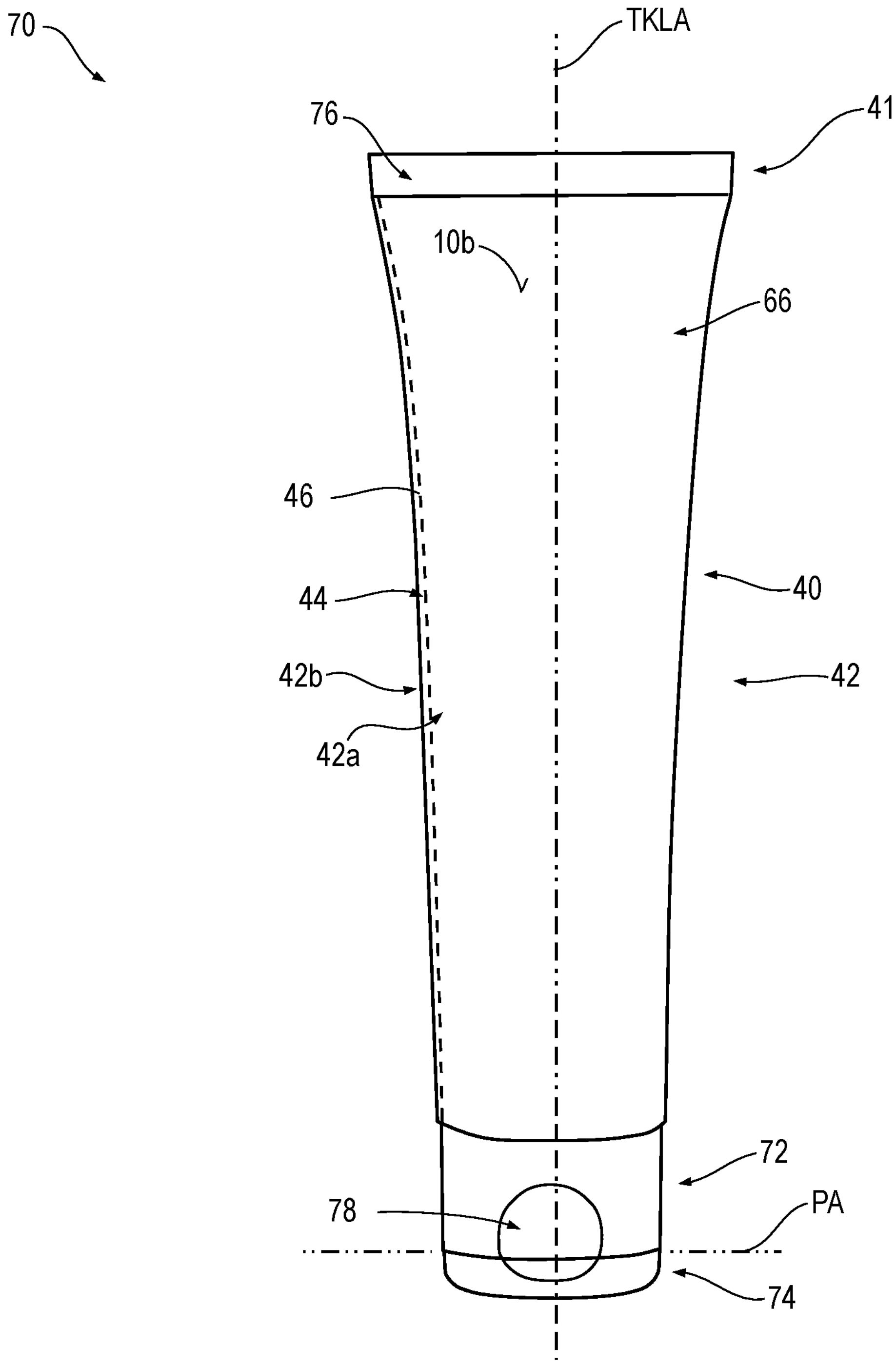

FIG. 5 shows a schematic front view of a tube container 70 exhibiting a tube body 40 made from the multilayer tube laminate 10 and a tube shoulder 72, where the tube shoulder 72 in the depicted example is configured integrally with a pivotable cap 74 on which the tube container 70 can stand. Alternatively, the tube body 40 can also be produced from the second embodiment of the multilayer tube laminate 110. Equally, instead of the tube body 40 with an overlap sealed seam, a tube body 50 with a butt sealed seam could be used in the tube container 70. The latter is even preferable.

For producing the tube body 40, as already described in connection with FIGS. 3 and 4, a cutting or blank 42 as the case may be of the multilayer tube laminate 10 is rolled around a mandrel such that the end regions 42*a* and 42*b* of the rolled blank 42 which are on the end side in the circumferential direction overlap. In the overlap region 44 thus created, the inner surface 10*a* overlaps the outer surface 10*b* axially along the tube body longitudinal axis TKLA and in the circumferential direction around the tube body longitudinal axis TKLA. The two end regions 42*a* and 42*b* are bonded in the overlap region 44 through hot sealing, in order to form the described overlap sealed seam 46.

At the longitudinal end 41 facing away from the tube shoulder 72, the tube body 40 is sealed by a fin sealed seam 76. Unlike the overlap sealed seam 46, where the inner surface 10*a* is sealed with the outer surface 10*b* of the tube laminate 10, in the fin sealed seam 76 opposite regions of the inner surface 10*a* are sealed with one another.

At the longitudinal end near the tube shoulder 72, the tube body 40 encloses part of the tube shoulder 72 and overlaps this part in the axial direction with respect to the tube body longitudinal axis TKLA and in the circumferential direction completely. The overlapping parts of the tube body 40 and of the tube shoulder 72 are likewise bonded through hot sealing. To this end, the tube shoulder 72 is preferably made from injection-molded biodegradable polymer such that the materials of the tube shoulder 72 and of the sealable layer 16 of the multilayer tube laminate 10, which forms the inner surface 10*a* of the tube laminate 10, are compatible with one another. In a preferred embodiment, the tube shoulder 72 can be injection molded from the same synthetic as the sealable layer 16 bonded with it through sealing, i.e. in the present example for instance PBS.

The tube shoulder 72 can alternatively, in order to achieve good recyclability, be made to more than 50% by weight, preferably to more than 75% by weight, as a preformed component from molded fiber. The tube shoulder 72, predominantly made from molded fiber, can exhibit an outer polymer skin for sealing bonding with the tube body 40, for instance from the same material as the sealable layer 16 or 116 or from a material compatible with it. The tube shoulder 72, predominantly made from molded fiber, can exhibit an inner polymer skin in order to shield the molded fiber against the product packaged in the tube container.

Molded fiber is mentioned here only by way of example for fiber-containing material, whose fibers at least in part, preferably predominantly in terms of mass, especially preferably completely, are of plant origin. The fiber-containing material is preferably made from a fiber-containing suspension through dehydration. Possible fiber material includes in particular cellulose, i.e. for example chemically broken-down plant fibers, mechanical pulp, i.e. for example lignin-containing woody material broken down through defibration, and waste paper.

The cap 74 is pivotable about a pivot axis PA, e.g. through a film hinge which connects the cap 74 integrally with the tube shoulder 72. A depression 78 facilitates the gripping and lifting of the cap 74 off the tube shoulder 72, in order to open the tube container 70.

Instead of a cap 74 bonded integrally with the tube shoulder 72, the cap can be formed separately from the tube shoulder and for example be screwable onto it and unscrewable from it. This embodiment is preferable for prefabricated tube shoulders made from fiber-containing material, in particular molded fiber.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A multilayer tube laminate for producing a tube container, comprising:

at least one paper layer, a polymer layer with a sealable exposed polymer surface on one side of the at least one paper layer, wherein the sealable exposed polymer surface forms an inner side of the multilayer tube laminate, and a polymer coating from an olefin-based material applied directly on the at least one paper layer on an outer side of the at least one paper layer facing away from the sealable polymer layer, wherein the polymer coating is formed to more than 90% by weight from a biodegradable polymer, wherein the polymer coating is a protective polymer coating with a weight per area in the range from 0.5 $g/m^2$ to 4.9 $g/m^2$.

2. The multilayer tube laminate according to claim 1, wherein the protective polymer coating consists of a biodegradable polymer.

3. The multilayer tube laminate according to claim 1, wherein the biodegradable polymer comprises or is at least one polymer out of polylactic acid, polybutylene succinate, a polyhydroxyalkanoate, in particular polyhydroxy butyrate and/or polyhydroxy butyrate hexanoate, polyvinyl alcohol, polybutylene adipate terephthalate, polycaprolactone, polyglycolide, a lignin-based thermoplastic, and an epoxy acrylate based on at least one oil.

4. The multilayer tube laminate according to claim 1, wherein the protective polymer coating carries applied printing formed from a layer of overprint varnish and a layer region of printing inks arranged between the overprint varnish layer and the protective polymer coating, where the overprint varnish lies free with its surface which faces away from the at least one paper layer.

5. The multilayer tube laminate according to claim 1, wherein the protective polymer coating comprises at least one acid-modified olefin.

6. The multilayer tube laminate according to claim 1, wherein the protective polymer coating consists of at least one acid-modified olefin.

7. The multilayer tube laminate according to claim 1, wherein the protective polymer coating has a weight per area in the range from 1 $g/m^2$ to 2.5 $g/m^2$.

8. The multilayer tube laminate according to claim 1, wherein the tube laminate exhibits a weight per area in the range from 150 $g/m^2$ to 400 $g/m^2$.

9. The multilayer tube laminate according to claim 1, wherein the tube laminate exhibits a thickness in the range from 200 μm to 400 μm.

10. The multilayer tube laminate according to claim 1, wherein the tube laminate exhibits at least one barrier layer for reducing an oxygen permeability and/or a water vapor permeability of the tube laminate, where the at least one barrier layer comprises a vinyl alcohol polymer and/or a metallization and/or a metal oxide or is formed from such a material.

11. The multilayer tube laminate according to claim 10, wherein the at least one barrier layer comprises a vinyl alcohol polymer or is formed from a vinyl alcohol polymer, where the vinyl alcohol polymer comprises or is polyvinyl alcohol and/or butenediol vinyl alcohol copolymer.

12. The multilayer tube laminate according to claim 11, wherein the tube laminate exhibits more than one paper layer, where one of the paper layers carries the barrier layer.

13. The multilayer tube laminate according to claim 10, wherein the tube laminate has an oxygen permeability of no more than 2.0 $cm^3/(m^2 \cdot d \cdot bar)$, measured in accordance with DIN 53380-3 at 23° C. and 50% relative humidity, and a water vapor permeability of no more than 2.0 $g/(m^2 \cdot d)$, measured in accordance with ISO 15106-2 at 23° C. and 85% relative humidity.

14. A tube body formed from a tube laminate according to claim 1, where the tube body comprises a tube laminate blank which is rolled about a tube body longitudinal axis, where end regions of the tube laminate blank which face towards one another in the circumferential direction about tube body longitudinal axis are bonded with one another through sealing, forming a sealed seam running in the direction along the tube body longitudinal axis, where the sealed seam either i) is a overlap sealed seam, in which the sealable polymer layer overlaps the protective polymer coating in an overlap region, where the overlap region extends in the circumferential direction and in the direction along the tube body longitudinal axis and where the sealable polymer layer and the protective polymer coating are firmly bonded with one another in the overlap region, or ii) is a butt sealed seam, in which the end regions which face towards one another in forming a butt joint which proceeds in the direction along the tube body longitudinal axis and radially away from the tube body longitudinal axis approach one another, where the butt joint on at least one radial side with respect to the tube body longitudinal axis is covered by a sealing strip which extends along the butt joint, spans the butt joint in the circumferential direction, and on each of the two circumferential sides of the butt joint with is firmly bonded with an exposed surface section of the tube laminate in the end regions.

15. A tube with a tube body according to claim 14 and further with a tube shoulder bonded with the tube body which exhibits at least one exposed surface consisting of a polyolefin encircling the tube body longitudinal axis, where an exposed surface of the tube body is firmly bonded through sealing with the encircling exposed surface of the tube shoulder.

16. The tube according to claim 15, wherein the tube shoulder is made from a biodegradable polymer.

17. The tube according to claim 15, wherein the tube shoulder is made completely from a biodegradable polymer.

* * * * *